(12) United States Patent
Ronsheim

(10) Patent No.: US 9,353,906 B1
(45) Date of Patent: May 31, 2016

(54) ATTACHMENT APPARATUS, SYSTEM AND METHOD

(71) Applicant: Stephen E. Ronsheim, Columbus, IN (US)

(72) Inventor: Stephen E. Ronsheim, Columbus, IN (US)

( * ) Notice: Subject to any disclaimer, the term of this patent is extended or adjusted under 35 U.S.C. 154(b) by 0 days.

(21) Appl. No.: 14/620,121

(22) Filed: Feb. 11, 2015

Related U.S. Application Data

(60) Provisional application No. 61/938,526, filed on Feb. 11, 2014.

(51) Int. Cl.
| | |
|---|---|
| *G03B 17/56* | (2006.01) |
| *F16M 13/02* | (2006.01) |
| *F16C 11/06* | (2006.01) |
| *F16C 11/10* | (2006.01) |

(52) U.S. Cl.
CPC ............ *F16M 13/02* (2013.01); *F16C 11/0614* (2013.01); *F16C 11/106* (2013.01); *G03B 17/561* (2013.01)

(58) Field of Classification Search
CPC .. G03B 17/561; F16M 13/02; F16C 11/0614; F16C 11/106
See application file for complete search history.

(56) References Cited

U.S. PATENT DOCUMENTS

| | | | | |
|---|---|---|---|---|
| 2,703,691 | A * | 3/1955 | Minnis .................... | F16M 11/14 108/146 |
| 3,747,884 | A * | 7/1973 | Steisslinger ............ | F16M 11/14 248/181.1 |
| 4,787,613 | A * | 11/1988 | Hayes ....................... | B25B 1/22 269/72 |
| 8,087,626 | B1 * | 1/2012 | Weeden .................. | F16M 11/14 248/218.4 |
| 2006/0110155 | A1 * | 5/2006 | Kouchi .................... | B60R 11/04 396/419 |
| 2010/0078537 | A1 * | 4/2010 | Chen ....................... | F16M 11/14 248/276.1 |
| 2013/0163978 | A1 * | 6/2013 | Carlesso .............. | F16M 11/106 396/428 |

* cited by examiner

*Primary Examiner* — W B Perkey
(74) *Attorney, Agent, or Firm* — Roberts IP Law; John Roberts

(57) ABSTRACT

Provided is an adjustable attachment apparatus, system and method, including in various example embodiments a block adapted to rotatably engage a ball portion of an arm, where the arm may be connected with a base that connects with a helical rotatable member. In various example embodiments the ball portion of the arm may "pop" in and out of the block when compressing fasteners in the block are loosened, and the ball portion of the arm may be locked in place by tightening the compressing fasteners, to position the arm and attached structures in any of a variety of positions. In various example embodiments the block may be rotatably mounted to a surface, and the base may be rotatably mounted to the arm, and the helical rotatable member may be pivotally mounted to the base. A plurality of arms may be connected together using one or more double-ended blocks.

18 Claims, 12 Drawing Sheets

200

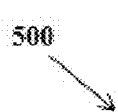
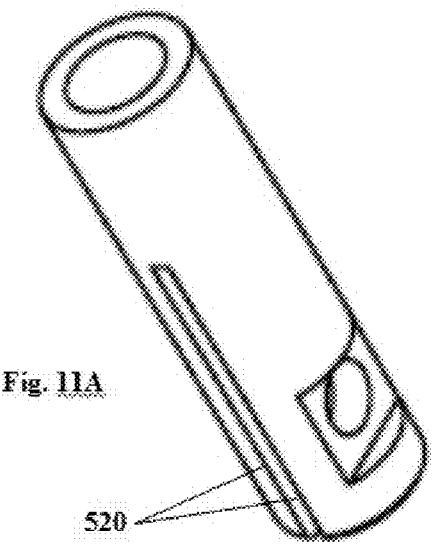
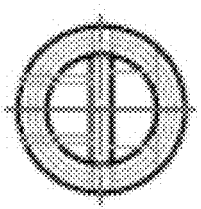
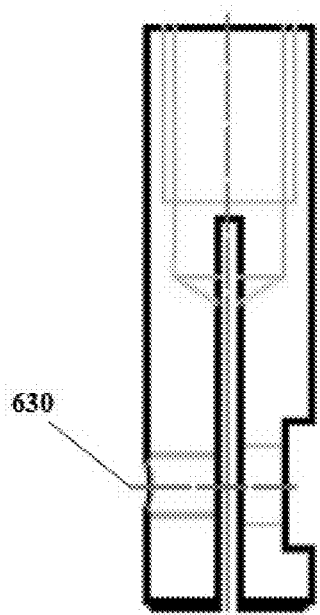
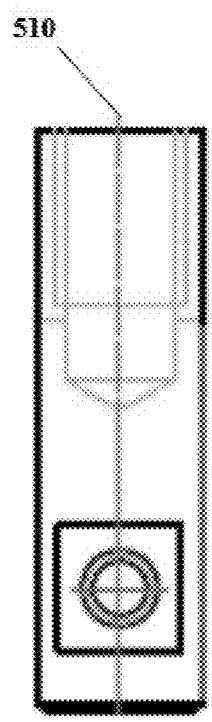
Fig. 11A
Fig. 11B
Fig. 11C
Fig. 11D

ATTACHMENT APPARATUS, SYSTEM AND METHOD

CROSS-REFERENCE TO RELATED APPLICATIONS

The present application is a non-provisional of, claims priority to, and incorporates herein by reference U.S. Pat. App. Ser. No. 61/938,526 to Ronsheim, filed Feb. 11, 2014.

FEDERALLY SPONSORED RESEARCH OR DEVELOPMENT

None.

TECHNICAL FIELD

The present invention relates generally to securement devices.

BACKGROUND

A background discussion of certain issues in the art is provided in U.S. Pat. No. 5,664,750 issued Sep. 9, 1997 to Cohen; Edward and entitled Camera Mount, which patent is incorporated herein by reference as if set forth herein in its entirety. Additional patents and published patent applications were also cited and incorporated by reference in U.S. Pat. App. Ser. No. 61/938,526 to Ronsheim, filed Feb. 11, 2014 (herein "the Ronsheim provisional"), the entirety of which is incorporated herein by reference.

While the prior art vision support systems discussed in the Ronsheim provisional are extremely robust and work well, they do require the tightening of eight screws to fasten the separate cap portion to the separate body portion to fixedly hold the ball of the arm in the socket of the body. Such prior art vision support systems thus require the manufacture, assembly, and adjustment of multiple parts and numerous fasteners. Also, the aforementioned prior art vision support systems are provided with only one "range notch," so the 150-degree rotation range is available in only one direction.

Another prior art support system is manufactured by A&P Tool, Inc. under the brand name Swivel Link®, an example of which is shown and discussed in the background section of the Ronsheim provisional.

One disadvantage of the Swivel Link® brand support system shown in the background section of the Ronsheim provisional is that it requires multiple separate relatively bulky parts and fasteners in addition to the arm, namely a base and a collar, where the collar wraps around and tightens against a ball on the base and also wraps around and tightens against a ball on the arm. Also, these Swivel Link® brand support systems are provided with "range notches" in only one direction.

Numerous other structures have been disclosed in the prior art, some of which were identified in the background section of the Ronsheim provisional. While various adjustable attachment mechanisms have previously been disclosed, a need remains for a modern, robust, attachment apparatus, system, and method that can be easier and quicker to use while being less expensive to manufacture.

SUMMARY

The present invention elegantly addresses all the above challenges and provides numerous additional benefits by providing a compact, easy to use and inexpensive to manufacture support system that uses only one piece in addition to the arm, a minimal number of fasteners, and which provides "range notches" in two opposed directions that can in certain embodiments be rotated about a single centrally-located bottom fastener to provide an extremely wide range of arm articulation in a small, highly robust package suitable for heavy duty industrial uses, all as shown and described herein.

Additionally, as part of the system otherwise disclosed herein or separate therefrom, a rotatable helical member is disclosed that comprises an inexpensive to manufacture, lightweight, thin-profile member with a flat proximal end adapted to be pivotably mounted to a protrusion or axle extending from a base so that the member can be fastenably locked in place relative to the base in a range of positions, a flat middle portion twisted about its longitudinal axis a predetermined number of degrees, for instance 15, 30, 45, 60, 75, or 90 degrees, into a helical shape, and a flat distal end adapted to provide mounting means for an item, such as a camera or machine vision system.

Examples embodying various aspects of the invention are shown and described herein and in the disclosure of the Ronsheim provisional, which is incorporated herein by reference. For example, provided in various example embodiments is an adjustable attachment apparatus comprising: a cylindrical block having a longitudinal axis; and an arm having a ball portion defining a convex portion of a sphere; wherein the cylindrical block comprises a bottom portion with two cantilevered sides extending distally from the bottom portion and defining a slot there between, the two cantilevered sides each defining in a distal portion thereof a concave portion adapted to rotatably and lockably engage the ball portion of the arm, and two fasteners each engaging and urging together the two cantilevered sides, the two fasteners located in a plane perpendicular to the longitudinal axis of the block and at least substantially recessed within the cylindrical block; wherein when the two fasteners are loosened the ball portion of the arm can be popped into place in between the two cantilevered sides and rotatably engaged by the concave portions of the two cantilevered sides; and wherein the concave portions of the two cantilevered sides are configured to lockably engage the ball portion of the arm when the two fasteners are tightened.

In various example embodiments the bottom portion of the cylindrical block comprises a centrally located fastener structure for fastening the adjustable attachment apparatus to a surface so that the adjustable attachment apparatus can be positioned rotationally about the centrally located fastener structure. In various example embodiments the arm, while rotatably engaged by the concave portions of the two cantilevered sides, can be rotated at least partially into a first side of the slot when the arm is in a first position and the arm can be rotated at least partially into a second side of the slot opposite the first side of the slot when the arm is in a second position. In various example embodiments the arm, while rotatably engaged by the concave portions of the two cantilevered sides, can be rotated at least partially about the ball portion in any plane coincident with the longitudinal axis of the cylindrical block. In various example embodiments the arm has a longitudinal axis, and the arm can be rotated about its longitudinal axis while rotatably engaged by the concave portions of the two cantilevered sides. In various example embodiments the arm, while rotatably engaged by the concave portions of the two cantilevered sides, can be locked in any position by tightening the two fasteners.

In various example embodiments the adjustable attachment apparatus may further comprise a base having a longitudinal axis and a slot extending along the longitudinal axis of the base, the base rotatably and lockably engaged with the arm about the longitudinal axis of the base; and a helical member having a proximal end comprising a first planar surface located at least partially in the slot and rotatably and lockably engaged with the base about an axis perpendicular to the longitudinal axis of the base, the helical member having a distal end comprising a second planar surface that is at an angle to the first planar surface.

In various example embodiments the angle between the first and second planar surfaces is 0, 90, 75, 60, 45, 30, 15, or any suitable number of degrees. In various example embodiments the longitudinal axis of the arm and the longitudinal axis of the base are coaxial. In various example embodiments the second planar surface comprises a mount configured to mount a camera. In various example embodiments the adjustable attachment apparatus further comprises a camera mounted to the mount. In various example embodiments the camera is a machine vision camera, as that term is understood in the industrial arts.

Additional aspects, alternatives and variations as would be apparent to persons of skill in the art are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

BRIEF DESCRIPTION OF THE DRAWINGS

The accompanying figures illustrate certain aspects of example embodiments of the invention, where:

FIG. 11A is a perspective view of an example base for a helical rotatable member, having a slot and a hole for a fastener to act as a pivot, and attachable to ball and post arm via a threaded stud (not shown).

FIG. 11B is an end view of the proximal end of the example base of FIG. 10A.

FIG. 11C is a side view of the example base of FIG. 10A, rotated about its longitudinal axis to show the slot.

FIG. 11D is a side view of the example base of FIG. 10A, rotated about its longitudinal axis to show the hole for a fastener to act as a pivot.

DETAILED DESCRIPTION OF EXAMPLE EMBODIMENTS

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by any claims which may be appended.

Any of the suitable technologies set forth and incorporated herein may be used to implement various example aspects of the invention as would be apparent to one of skill in the art.

Provided in certain example embodiments is a compact, easy to use and inexpensive to manufacture support system 1000 that in various example embodiments may use only one piece 100 in addition to an arm 200, a minimal number of fasteners 300, and which provides "range notches" 150, 151 in two opposed directions that can in certain embodiments be rotated about a single centrally-located bottom fastener 180 to provide an extremely wide range of arm articulation in a small, highly robust package suitable for heavy duty industrial uses such as, for example, industrial machine vision support systems.

Figure 10:
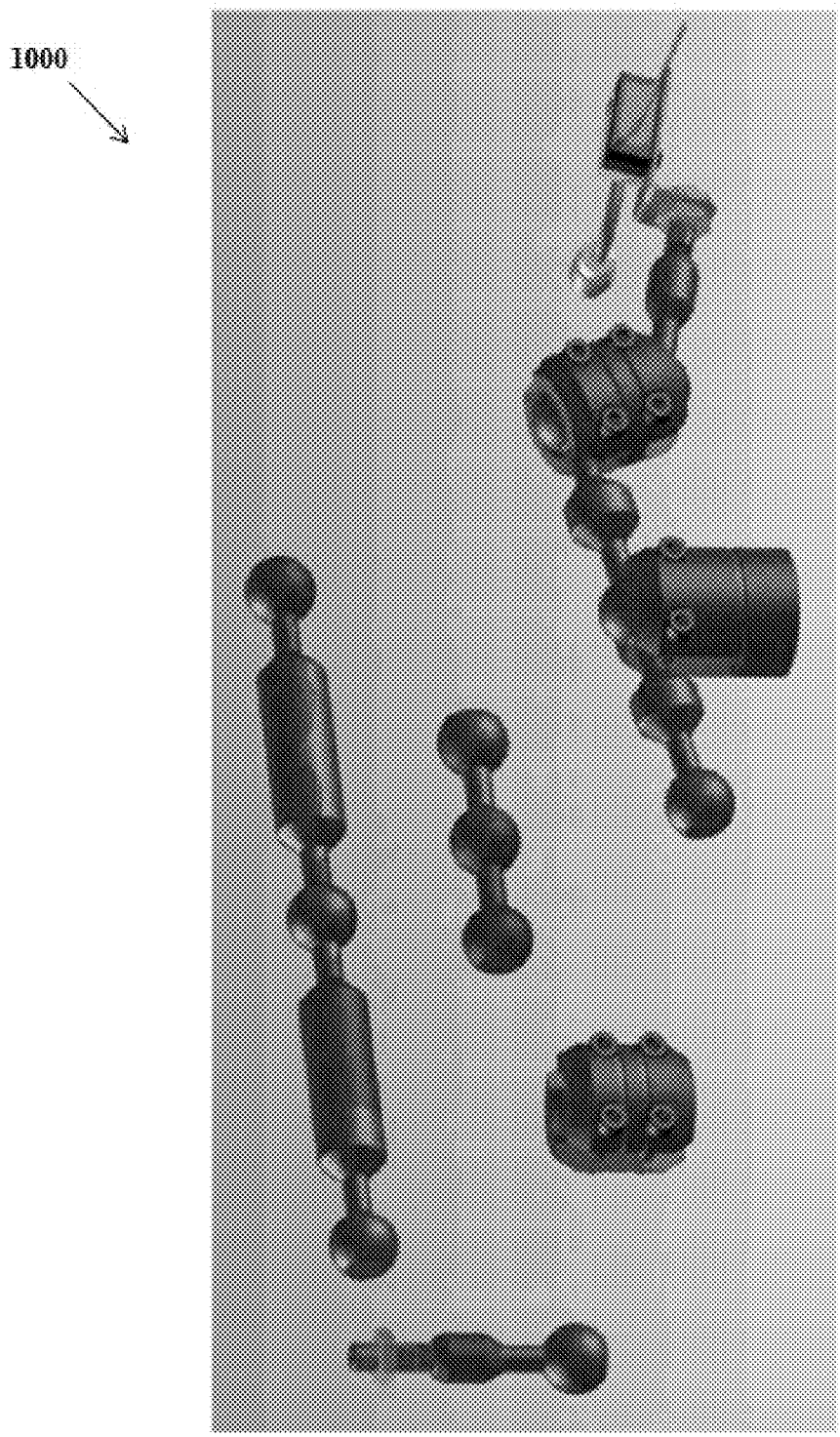
FIG. 10 is a depiction of a block usable with a variety of different style arms having a plurality of balls and posts, and two double-ended blocks adapted to receive the balls of arms in both the top and bottom of the double-ended blocks, for instance for connecting a plurality of arms together.

In certain example embodiments the one-piece base or block 100 may comprise a bottom portion 120 having centrally located fastener attachment means 180, with two cantilevered sides 130, 140 extending upward from the bottom portion 120, the two sides 130, 140 forming a slot 150 there between, the two sides 130, 140 having interior-facing surfaces 160, 170 adapted to slidably engage with the ball end 210 of an arm 200 (e.g., a ball of a ball and post structure, a variety of which are shown in FIG. 10). The interior-facing surfaces 160, 170 may be machined or otherwise formed to have curved concave surfaces 160, 170 dimensionally adapted to mate with the spherical outer surface 220 of the ball portion 210 of an arm 200. One or more fasteners 300 or other suitable means may be provided that engage with both the sides 130, 140 and function to pull the sides 130, 140 toward one another, thereby causing the interior-facing surfaces 160, 170 of the sides 130, 140 to engage and compress against the ball portion 210 of an arm 200, when the ball portion 210 of an arm 200 is placed between the two sides 130, 140.

It has been found that the geometry shown in the present examples, where there is a slight interference fit between the concave surfaces 160, 170 and the ball portion 210 of an arm 200, works well. In one example the amount of interference is nominally five thousandths of an inch, plus or minus two thousands of an inch, but alternatively could be seven thousandths of an inch, plus or minus two or three thousands of an inch, ten thousandths of an inch, plus or minus five thousands of an inch, or any other suitable dimensions that allow the ball portion 210 of an arm 200 to securely "pop" in between the concave surfaces 160, 170 of the sides of the slot 150 in the block 100, by slightly bending outward the two cantilever sides 130, 140 by physically pushing the ball portion 210 of an arm 200 into the slot 150, which is facilitated by the curved outer surface 220 of the ball portion 210. In the embodiments shown the removal and replacement of the arm 200 from the block 100 can be accomplished by hand and without tools, once the fasteners 300 are loosened.

Figure 1:
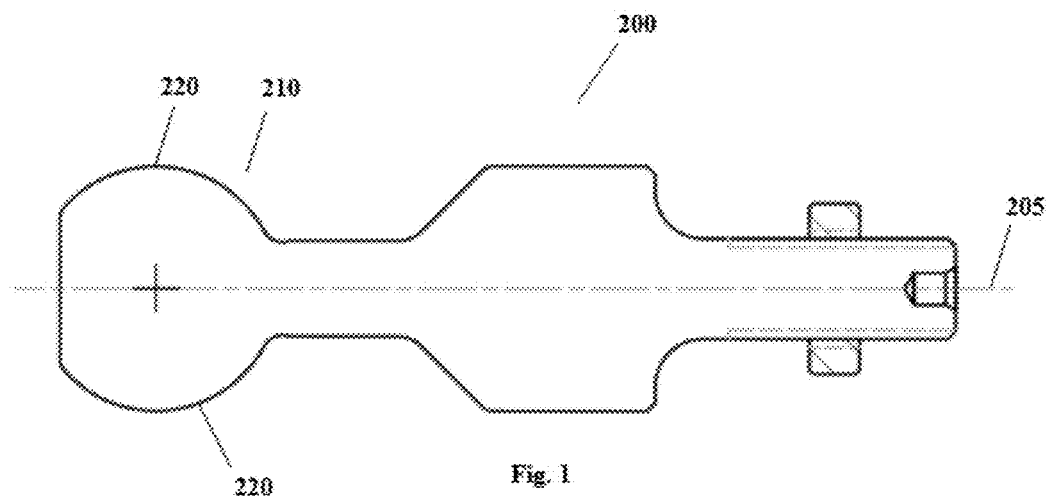
FIG. 1 is side elevation view of an example arm, including ball and post, according to various example embodiments.
Figure 2:
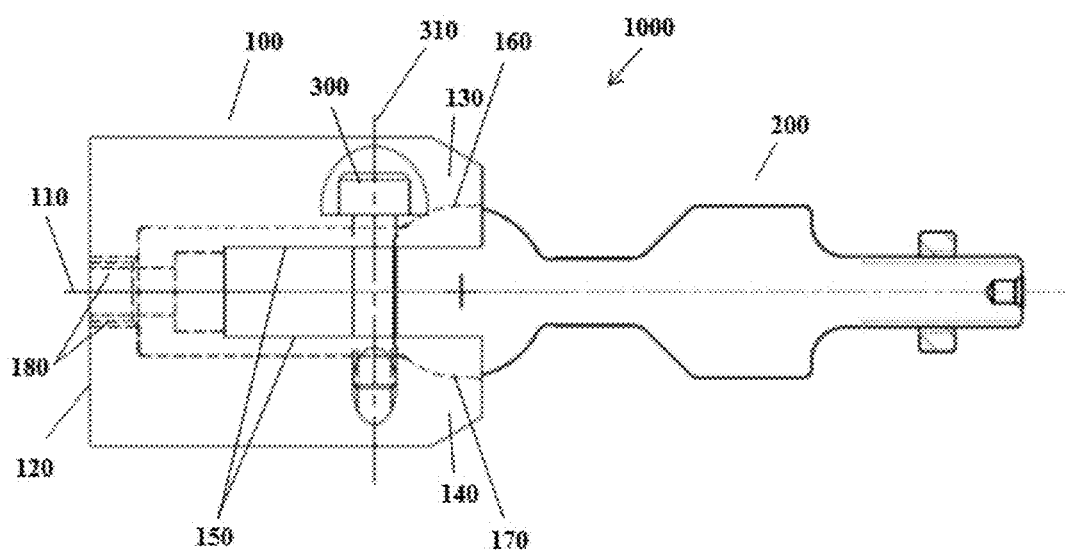
FIG. 2 is side elevation view of an example adjustable attachment apparatus and system, according to various example embodiments.
Figure 3:
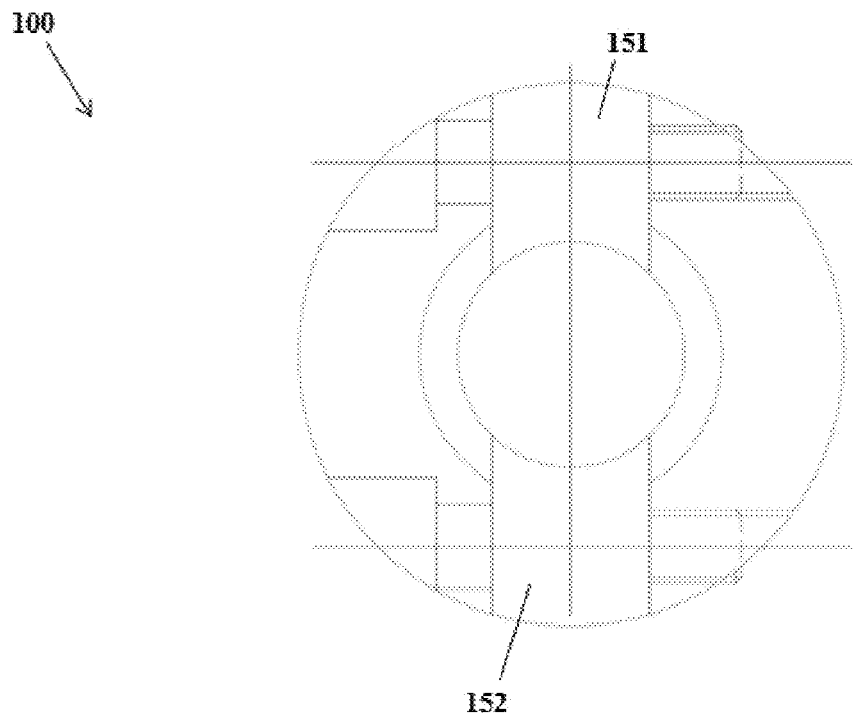
FIG. 3 is a top plan view of an example block, shown in a first position rotated about its central longitudinal axis (for clearer viewing, lines in this view are shown solid, including hidden lines).
Figure 4:
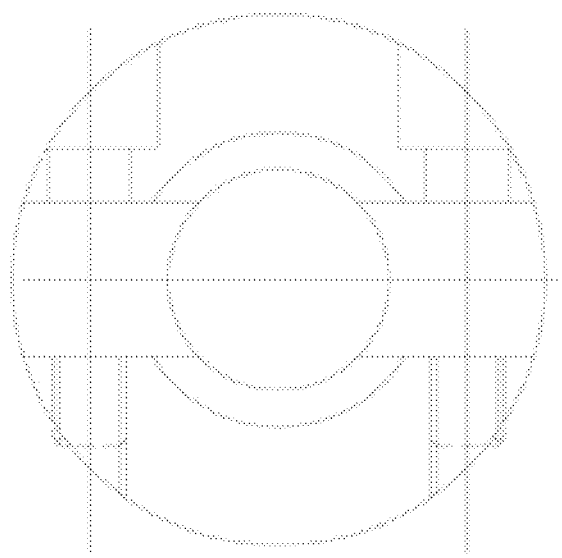
FIG. 4 is a top plan view of the example block of FIG. 3, shown in a second position rotated about is central longitudinal axis (for clearer viewing, lines in this view are shown solid, including hidden lines).
Figure 5:
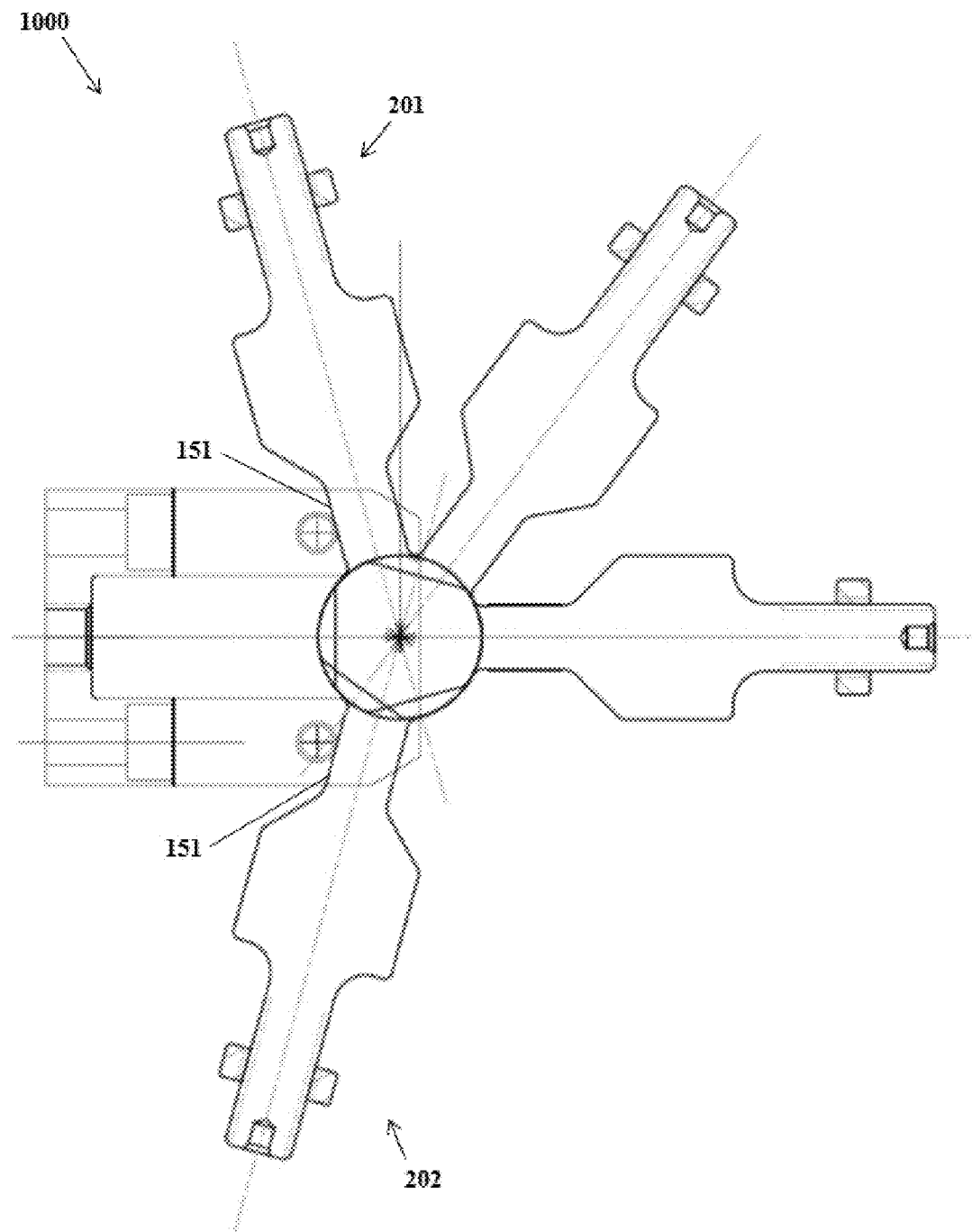
FIG. 5 is a side elevation view of example adjustable attachment apparatus and system of FIG. 2, depicting various example positions in which the arm can be selectively locked in place (for clearer viewing, lines in this view are shown solid, including hidden lines).
Figure 6:
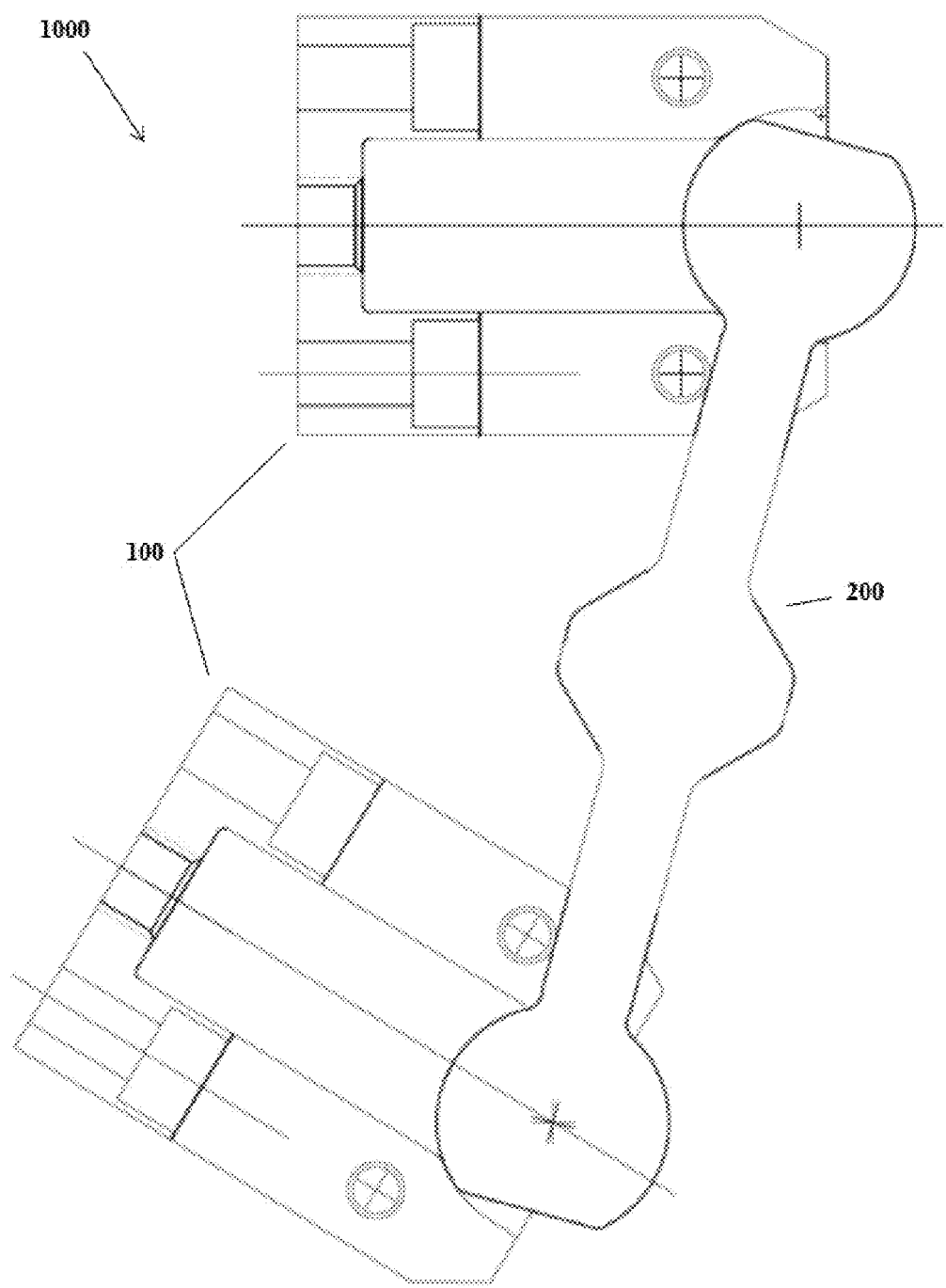
FIG. 6 is a side elevation view of an example adjustable attachment apparatus and system, including a double-ball arm and two blocks (for clearer viewing, lines in this view are shown solid, including hidden lines).
Figure 7:
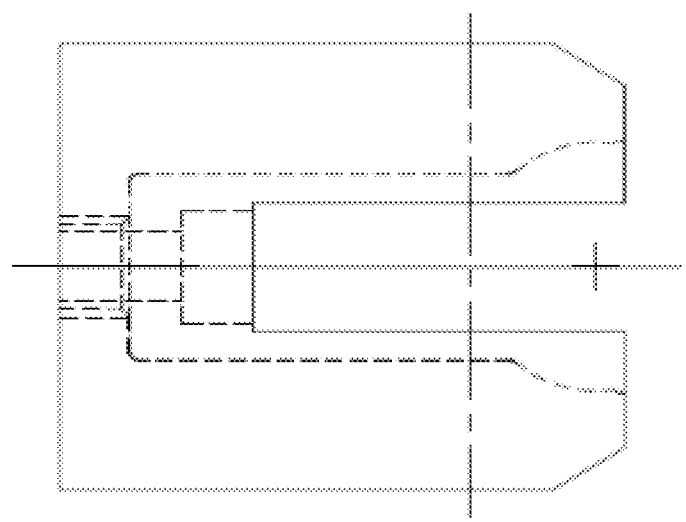
FIG. 7 is a side elevation view of an example block, shown rotated about its longitudinal axis to display the slot.
Figure 8:
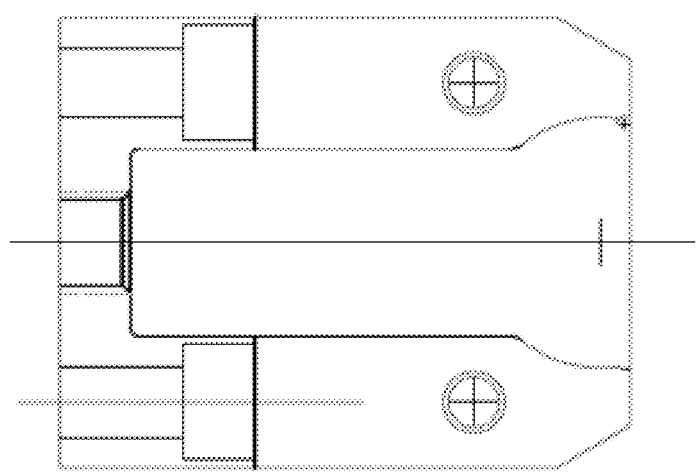
FIG. 8 is a side elevation section view of the example block of FIG. 7, shown rotated about its longitudinal axis by 90 degrees from the position shown in FIG. 7 (for clearer viewing, lines in this view are shown solid, including hidden lines).
Figure 9B:
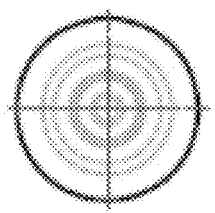
FIG. 9B is an end view of the proximal end of the example arm of FIG. 9A.
Figure 9C:
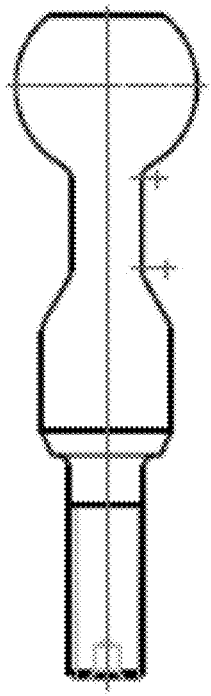
FIG. 9C is a side view of the example arm of FIG. 9A.
Figure 9D:
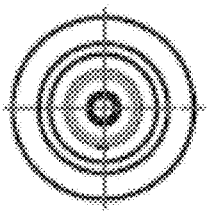
FIG. 9D is an end view of the distal end of the example arm of FIG. 9A.
Figure 9A:
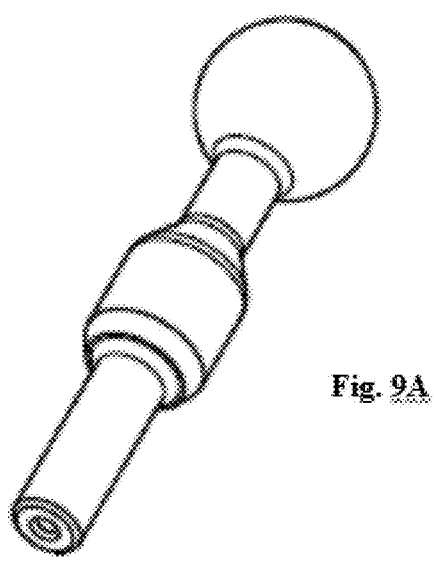
FIG. 9A is a perspective view of an example ball and post arm for use with structure shown previously, having a threaded hole in a distal end for receiving a base for a helical rotatable member.

Once the ball portion 210 of an arm 200 is slidably engaged in the slot 150 by taking the above steps, the arm 200 can be articulated in all directions relative to the block 100, as shown in the Figures, including optionally into one or two "range notches" 151, 152, such as two directly opposed sides of the slot 150, allowing a wide angle of movement in that plane, for instance as shown in FIG. 5. That plane of arm movement can then be rotated about the longitudinal axis 110 of the block 100 by rotating the block 100 about central fastening means 180 in the bottom 120 of the block 100, thereby providing a wide angle of movement of the arm 200 in all directions.

After the arm 200 is moved into its preferred location, the user can tighten the one or more fasteners 300 or other suitable means that engage with both of the cantilevered sides 130, 140 and thereby pull the sides 130, 104 toward one another, causing the interior-facing surfaces 160, 170 of the sides 130, 140 to engage and compress against the ball portion 210 of an arm 200 and to lock the arm 200 into place. The location of the arm 200 can thereafter be adjusted by loosening said fasteners 300, moving (and/or rotating) the arm 200, and then re-tightening the fasteners 300. Also in various example embodiments, once said fasteners 300 are sufficiently loosened, the arm can be "popped" out of its socket formed by the concave interior surfaces 160, 170 of the sides 130, 140, by physically pulling the arm 200 away from the block 100. These steps can be repeated and reversed any suitable number of times with the same parts. The block 100 can be manufactured out of any suitable material, such as aluminum or steel, or any material suitable for similar parts.

Figure 12A:
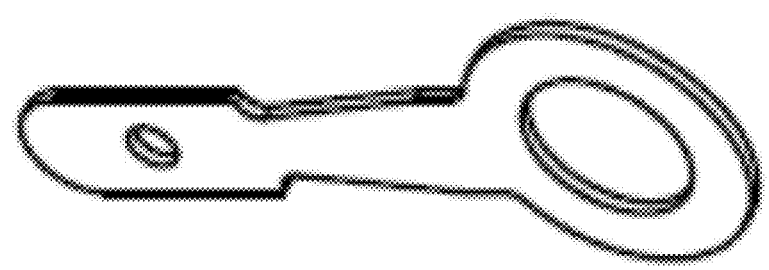
FIG. 12A is a perspective view of an example helical rotatable member (shown flat before twisting middle portion into helical shape).
Figure 12B:
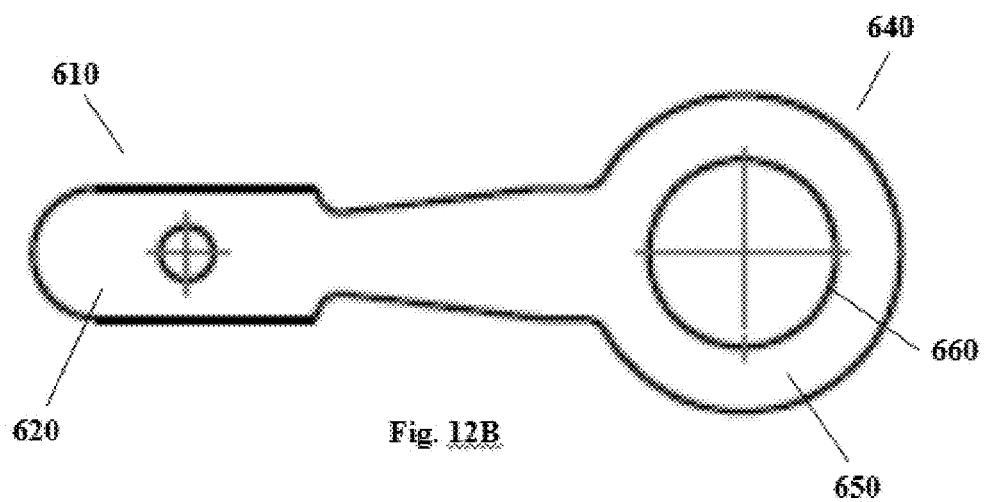
FIG. 12B is a top plan view of the example helical rotatable member of FIG. 11A (shown flat before twisting middle portion into helical shape).
Figure 12C:
FIG. 12C is a side elevation view of the example helical rotatable member of FIG. 11A (shown flat before twisting middle portion into helical shape).
Figure 13:
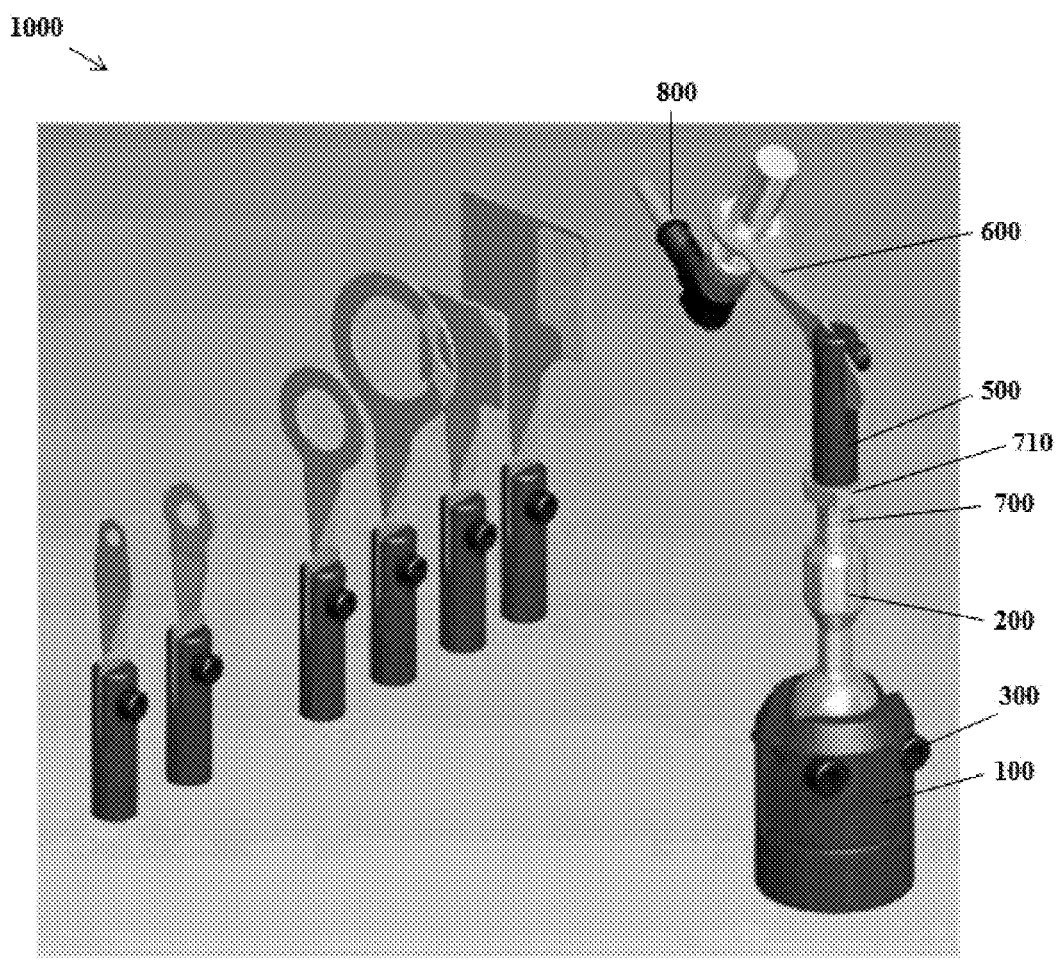
FIG. 13 is a depiction of a plurality of bases, each rotatably attached with one of a variety of example helical rotatable members having a variety of distal portions for different applications, such as for mounting various types of sensors.
Figure 14:
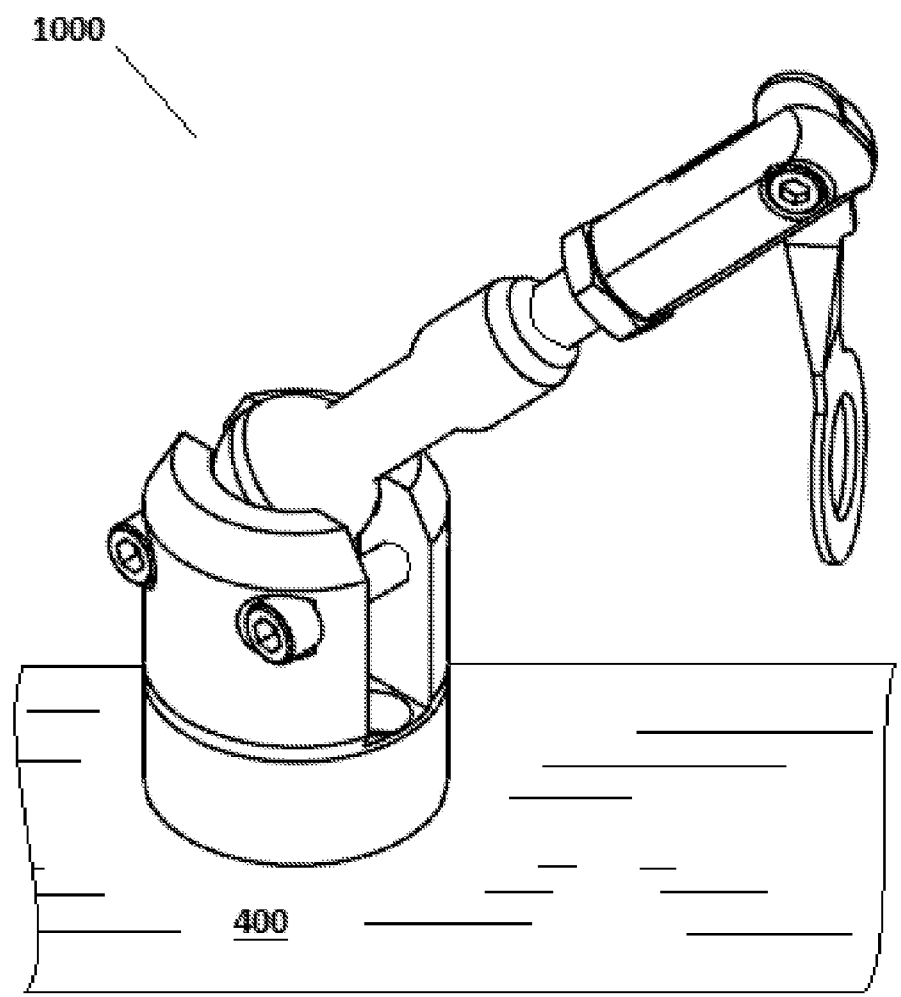
FIG. 14 is a perspective view of an example attachment system comprising a block pivotally attached with the proximal portion of an arm, the distal portion of the arm attached with a base via a fastener such as a stud, and a helical rotatable member rotatably attached with the base, wherein the helical rotatable member is shown in a first position.
Figure 15:
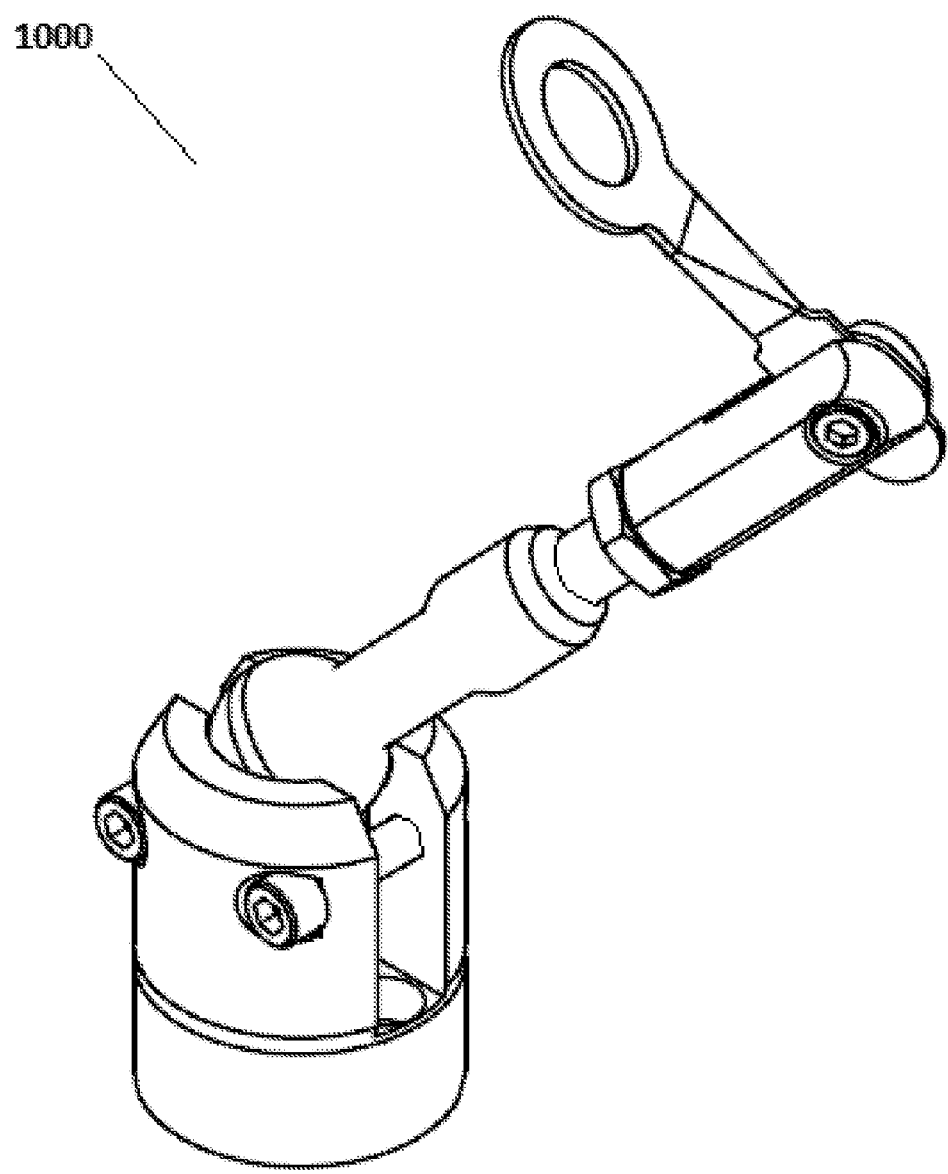
FIG. 15 is a perspective view of the example attachment system of FIG. 14, wherein the helical rotatable member is shown in a second position.

Additionally, as part of the system otherwise disclosed herein or separate therefrom, a rotatable helical member 600 is disclosed that comprises an inexpensive to manufacture, lightweight, thin-profile member with a flat proximal end 610 adapted to be pivotably mounted to a protrusion or axle 630 attached with a base 500 so that the member 600 can be fastenably locked in place relative to the base 500 in a range of positions. Rotatable helical member 600 may comprise an initially flat middle portion (as shown in FIGS. 12A-12C) that is subsequently twisted about its longitudinal axis a predetermined number of degrees, for instance 15, 30, 45, 60, 75, or 90 degrees, into a helical shape, as shown in the examples in FIGS. 13-15. Rotatable helical member 600 may comprise a flat distal end 640 adapted to provide mounting means for an item, such as a sensor, camera or machine vision system 800. The member 600 may in certain example embodiments be constructed by stamping a flat, thin piece of metal, such as aluminum, steel, or stainless steel, for instance 0.060 inch thick by one or two inch wide stainless steel coil, into a flat version of the member having its outer profile, a pivot hole, and one or more item mounting holes formed therein by the stamping procedure, for instance as shown in FIGS. 12A-12C. Alternatively, the holes and outer profile may be machined from appropriate material stock instead of stamped. The resulting flat version of the member, examples of which are shown in FIGS. 12A-12C, can then be twisted about its longitudinal axis a predetermined number of degrees, for instance 15, 30, 45, 60, 75, or 90 degrees, into a helical shape, as shown in FIGS. 13-15 (the example shown were twisted 90 degrees). Alternatively, the member 600 may be left flat, or twisted 0 degrees, as shown in FIGS. 12A-12C. The twisting may be accomplished by, for instance, placing the flat version of the member 600 in a fixture (not shown) wherein the proximal end 610 is sandwiched between two first rigid surfaces (not shown) and the distal end 640 is sandwiched between two second rigid surfaces (not shown), and the fixture then provides that the first and second rigid surfaces rotate relative to each other by the predetermined number of degrees, thereby yielding the material constituting the middle portion into the desired helical shape. The resulting helical member 600 has a flat proximal end 610 defining a first plane and a flat distal end 640 defining a second plane, wherein the first and second planes are fixed in relative rotation with respect to each other by the predetermined number of degrees.

The base 500 may be any suitable structure except where otherwise claimed, such as, for example, a cylinder, column, block, or other structure made of any suitable material, such as aluminum, steel, or stainless steel. The base 500 may have a slot 520 cut longitudinally into one end, the slot 520 being of sufficient width and depth to accept the proximal end 610 of the helical member 600, and a hole drilled or otherwise formed through the side of the base 500 and into the slot 520, whereby a fastener, pin, axle, or other structure 630 can be passed through said hole and into or through the pivot hole in the proximal end 610 of the helical member 600. This is just one example; any structure can be used that provides the functionality of the helical member 600 being fixably rotatable about the base 500. In one example a fastener is placed into the hole in the side of a cylinder and through the pivot hole in the helical member, and at least some portion of the hole in the cylinder (or column, block, or other structure) is threaded to engage the fastener, such that the helical member 600 can be rotated or pivoted about the pivot hole then releasably fastened in place by tightening the fastener 630. The base 500 may be provided with attachment means to attach to any of the other structures or machines mentioned herein, such as an arm, post, or block. For example, the base may be threaded on one end (male or female) and the arm, post, block, or other mating structure may have a corresponding threaded portion (female or male). Examples are shown in images and drawings provided herein. In all of the example embodiments discussed herein, it is understood that the various components can be repeatedly locked in place with respect to each other in a wide variety of possible positions and rotations, and then loosened and moved to other positions and rotations, and interchanged with other or additional components, and then locked in place again.

Accordingly, provided in certain example embodiments is an adjustable attachment apparatus, system and method of use (collectively, 1000), including in various example embodiments a block adapted to rotatably engage a ball portion of an arm, where the arm may be connected with a base that connects with a helical rotatable member. In various example embodiments the ball portion of the arm may "pop" in and out of the block when compressing fasteners in the block are loosened, and the ball portion of the arm may be locked in place by tightening the compressing fasteners, to position the arm and attached structures in any of a variety of positions. In various example embodiments the block may be rotatably mounted to a surface, and the base may be rotatably mounted to the arm, and the helical rotatable member may be pivotally mounted to the base. A plurality of arms may be connected together using one or more double-ended blocks.

For example, with reference to the example embodiments shown in FIGS. 1-15, provided in various example embodiments is an adjustable attachment apparatus comprising: a cylindrical block 100 having a longitudinal axis 110; and an arm 200 having a ball portion 210 defining a convex portion 220 of a sphere; wherein the cylindrical block 100 comprises a bottom portion 120 with two cantilevered sides 130, 140, extending distally from the bottom portion 120 and defining a slot 150 there between, the two cantilevered sides 130, 140, each defining in a distal portion thereof a concave portion 160, 170, adapted to rotatably and lockably engage the ball portion 210 of the arm 200, and two fasteners 300 each engaging and urging together the two cantilevered sides 130, 140, the two fasteners 300 located in a plane 310 perpendicular to the longitudinal axis 110 of the block and at least substantially recessed within the cylindrical block 100; wherein when the two fasteners 300 are loosened the ball portion 210 of the arm 200 can be popped into place in between the two cantilevered sides 130, 140, and rotatably engaged by the concave portions 160, 170 of the two cantilevered sides 130, 140; and wherein the concave portions 160, 170 of the two cantilevered sides 130, 140 are configured to lockably engage the ball portion 210 of the arm 200 when the two fasteners 300 are tightened.

In various example embodiments the bottom portion 120 of the cylindrical block 100 may comprise a centrally located fastener structure 180 for fastening the adjustable attachment apparatus to a surface 400 so that the adjustable attachment apparatus can be positioned rotationally about the centrally located fastener structure 180. In various example embodiments the arm 200, while rotatably engaged by the concave portions 160, 170 of the two cantilevered sides 130, 140, can be rotated at least partially into a first side 151 of the slot 150 when the arm 200 is in a first position 201 and the arm 200 can be rotated at least partially into a second side 152 of the slot 150 opposite the first side 151 of the slot 150 when the arm 200 is in a second position 202, for instance as depicted in FIG. 5. In various example embodiments the arm 200, while rotatably engaged by the concave portions 160, 170 of the two cantilevered sides 130, 140, can be rotated at least partially about the ball portion 210 in any plane coincident with the longitudinal axis 110 of the cylindrical block 100. For instance, see FIGS. 5, 6, 14, and 15. In various example embodiments the arm 200 has a longitudinal axis 205, and the arm 200 can be rotated about its longitudinal axis 205 while rotatably engaged by the concave portions 160, 170 of the two cantilevered sides 130, 140. In various example embodiments the arm 200, while rotatably engaged by the concave portions 160, 170 of the two cantilevered sides 130, 140, can be locked in any position by tightening the two fasteners 300.

In various example embodiments the adjustable attachment apparatus may further comprise a base 500 having a longitudinal axis 510 and a slot 520 extending along the longitudinal axis 510 of the base 500, the base 500 rotatably and lockably engaged with the arm 200 (for instance by a stud 700 and locking nut 710) about the longitudinal axis 510 of the base 500; and a helical member 600 having a proximal end 610 comprising a first planar surface 620 located at least partially in the slot 520 and rotatably and lockably engaged with the base 500 about an axis 630 perpendicular to the longitudinal axis 510 of the base 500, the helical member 600 having a distal end 640 comprising a second planar surface 650 that is at an angle to the first planar surface 620.

In various example embodiments the angle between the first and second planar surfaces 620, 650, is 0, 90, 75, 60, 45, 30, 15, or any suitable number of degrees. In various example embodiments the longitudinal axis 205 of the arm 200 and the longitudinal axis 510 of the base 500 are coaxial, as shown in the Figures. In various example embodiments the second planar surface 650 comprises a mount 660 configured to mount a camera or other sensor 800, for instance as depicted in FIG. 13. In various example embodiments the adjustable attachment apparatus further comprises a camera 800 mounted to the mount 660. In various example embodiments the camera 800 is a machine vision camera, as that term is understood in the industrial arts (e.g., the technology and methods used to provide imaging-based automatic inspection and analysis for such applications as automatic inspection, process control, and robot guidance in industry).

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible as would be apparent to a person of ordinary skill in the art. The invention may include any device, structure, method, or functionality, as long as the resulting device, system or method falls within the scope of one of the claims that are allowed by the patent office based on this or any related patent application.

What is claimed is:

1. An adjustable attachment apparatus comprising:
   a cylindrical block having a longitudinal axis; and
   an arm having a ball portion defining a convex portion of a sphere;
   wherein the cylindrical block comprises a bottom portion with two cantilevered sides extending distally from the bottom portion and defining a slot there between, the two cantilevered sides each defining in a distal portion thereof a concave portion adapted to rotatably and lockably engage the ball portion of the arm, and two fasteners each engaging and urging together the two cantilevered sides, the two fasteners located in a plane perpendicular to the longitudinal axis of the block and at least substantially recessed within the cylindrical block;

wherein when the two fasteners are loosened the ball portion of the arm can be popped into place in between the two cantilevered sides and rotatably engaged by the concave portions of the two cantilevered sides; and wherein the concave portions of the two cantilevered sides are configured to lockably engage the ball portion of the arm when the two fasteners are tightened.

2. The adjustable attachment apparatus of claim 1, wherein the bottom portion of the cylindrical block comprises a centrally located fastener structure for fastening the adjustable attachment apparatus to a surface so that the adjustable attachment apparatus can be positioned rotationally about the centrally located fastener structure.

3. The adjustable attachment apparatus of claim 1, wherein the arm, while rotatably engaged by the concave portions of the two cantilevered sides, can be rotated at least partially into a first side of the slot when the arm is in a first position and the arm can be rotated at least partially into a second side of the slot opposite the first side of the slot when the arm is in a second position.

4. The adjustable attachment apparatus of claim 3, wherein the arm, while rotatably engaged by the concave portions of the two cantilevered sides, can be rotated at least partially about the ball portion in any plane coincident with the longitudinal axis of the cylindrical block.

5. The adjustable attachment apparatus of claim 4, wherein the arm has a longitudinal axis, and the arm can be rotated about its longitudinal axis while rotatably engaged by the concave portions of the two cantilevered sides.

6. The adjustable attachment apparatus of claim 5, wherein the arm, while rotatably engaged by the concave portions of the two cantilevered sides, can be locked in any position by tightening the two fasteners.

7. The adjustable attachment apparatus of claim 6, further comprising:

a base having a longitudinal axis and a slot extending along the longitudinal axis of the base, the base rotatably and lockably engaged with the arm about the longitudinal axis of the base; and a helical member having a proximal end comprising a first planar surface located at least partially in the slot and rotatably and lockably engaged with the base about an axis perpendicular to the longitudinal axis of the base, the helical member having a distal end comprising a second planar surface that is at an angle to the first planar surface.

8. The adjustable attachment apparatus of claim 7, wherein the angle between the first and second planar surfaces is 0 degrees.

9. The adjustable attachment apparatus of claim 7, wherein the angle between the first and second planar surfaces is 90 degrees.

10. The adjustable attachment apparatus of claim 7, wherein the angle between the first and second planar surfaces is 75 degrees.

11. The adjustable attachment apparatus of claim 7, wherein the angle between the first and second planar surfaces is 60 degrees.

12. The adjustable attachment apparatus of claim 7, wherein the angle between the first and second planar surfaces is 45 degrees.

13. The adjustable attachment apparatus of claim 7, wherein the angle between the first and second planar surfaces is 30 degrees.

14. The adjustable attachment apparatus of claim 7, wherein the angle between the first and second planar surfaces is 15 degrees.

15. The adjustable attachment apparatus of claim 7, wherein the longitudinal axis of the arm and the longitudinal axis of the base are coaxial.

16. The adjustable attachment apparatus of claim 7, wherein the second planar surface comprises a mount configured to mount a camera.

17. The adjustable attachment apparatus of claim 16, further comprising a camera mounted to the mount.

18. The adjustable attachment apparatus of claim 17, wherein the camera is a machine vision camera.

* * * * *